United States Patent
Wu et al.

(10) Patent No.: US 10,336,620 B2
(45) Date of Patent: Jul. 2, 2019

(54) METHOD OF MAKING A GRAPHITE FILM

(71) Applicant: TAIMIDE TECH. INC., Hsinchu (TW)

(72) Inventors: Jia-Hao Wu, Hsinchu (TW); Yu-Chen Lai, Hsinchu (TW)

(73) Assignee: TAIMIDE TECH. INC., Hsinchu (TW)

( * ) Notice: Subject to any disclaimer, the term of this patent is extended or adjusted under 35 U.S.C. 154(b) by 0 days.

(21) Appl. No.: 15/720,104

(22) Filed: Sep. 29, 2017

(65) Prior Publication Data

US 2019/0100438 A1    Apr. 4, 2019

(51) Int. Cl.
  *C01B 32/205*  (2017.01)
  *B32B 27/28*  (2006.01)

(52) U.S. Cl.
  CPC .......... *C01B 32/205* (2017.08); *B32B 27/281* (2013.01); *B32B 2313/04* (2013.01)

(58) Field of Classification Search
  CPC .. C01B 32/205; B32B 27/281; B32B 2313/04
  See application file for complete search history.

(56) References Cited

U.S. PATENT DOCUMENTS

| 2013/0164210 A1 | 6/2013 | Ohta et al. |
| 2014/0015153 A1 | 1/2014 | Ohta et al. |

FOREIGN PATENT DOCUMENTS

| JP | 2008-24571 | * 7/2006 | ............. C01B 31/04 |
| KR | 10-2013-0100296 A | 9/2013 | |
| KR | 10-2014-0005268 A | 1/2014 | |

OTHER PUBLICATIONS

Machine Translation of JP 2008-024571 (Year: 2008).*

* cited by examiner

*Primary Examiner* — Daniel C. McCracken
(74) *Attorney, Agent, or Firm* — Li & Cai Intellectual Property (USA) Office

(57) ABSTRACT

A method of making a graphite film is provided. The method is characterized in that a polyimide film is used as a precursor, and a carbonizing heat treatment is performed, in which the carbonizing temperature ranges from 500 to 800 degrees Celsius and the heating rate is equal to or lower than 2 degrees Celsius per minute. The highest carbonizing temperature is equal to or higher than 1000 degrees Celsius. The method is also characterized in that the graphitizing temperature ranges from 2200 degrees temperature to the highest graphitizing temperature in which the average heating rate is equal to or lower than 3 degrees Celsius per minute. The highest graphitizing temperature is equal to or higher than 2500 degrees Celsius.

12 Claims, 5 Drawing Sheets

METHOD OF MAKING A GRAPHITE FILM

BACKGROUND OF THE INVENTION

1. Field of the Invention

The present disclosure relates to a method of making a graphite film; more particularly, to a method using a polyimide film as a precursor, which is processed with a heat treatment so as to form a carbonized film, which is then processed with a graphitizing heat treatment to form a graphite film, in which the heating rates for carbonization and graphitization are controlled at specific values so as to obtain a graphite film of high quality.

2. Description of Related Art

Making electronic devices slim and light has become a trend due to the rapid growth of mobile devices, in which electronic components are often stacked together closely so as to reduce the overall size. Therefore, effectively dissipating heat from chips, backlit modules and batteries has become an important issue. As standards for thermal conductivity and heat dissipating efficiency increase, artificial graphite film came available on the market meeting both requirements. Artificial graphite films exhibit high electrical conductivity, flexibility and thermal conductivity four times higher than copper and are thus widely used in electronic devices.

High-thermal conductivity graphite films are formed by pyrolyzing and recombining aromatic polymer films, and this kind of heat treatment process is called carbonization and graphitization. A carbonization process is performed to pyrolyze non-carbon elements, and the operating temperature ranges from 501 to 1300 degrees Celsius. A graphitization process is performed to activate carbon atoms such that the carbon atoms recombine with each other and form an orderly layer structure. During graphitization, in which the operating temperature ranges from 2000 to 3000 degrees Celsius, bubbles are generated, forming a porous graphite structure. Afterwards, a rolling process is performed on the porous graphite structure to obtain a flexible graphite film that is applicable to electronic devices serving to dissipate heat and shield electromagnetic energy.

The existence of adhesive remnants on the surface of graphite films is an issue for both the superposition sintering process, in which multiple layers are stacked and welded together, and the wind welding process, in which a continuous layer is formed into a roll. The film surface of the carbonized film formed by the above processes has the tendency to stick to that of another carbonized film, resulting in defects or damage on the film surface and reducing the yield.

SUMMARY OF THE INVENTION

The method of making a carbonized film according to the present disclosure is characterized in that: the heating temperature during the carbonizing heat treatment ranges from 500 to 800 degrees Celsius, in which the average heating rate is equal to or lower than 2 degrees Celsius per minute, and the highest carbonizing temperature is equal to or higher than 1000 degrees Celsius.

The carbonized film made according to the method of the present disclosure has a reduced tendency to stick to another carbonized film; therefore, the present disclosure enhances the quality of carbonized films.

The method of making a graphite film according to the present disclosure is characterized in that: a heat treatment is performed on the carbonized film, in which the graphitizing temperature during the graphitizing heat treatment is increased from 2200 degrees Celsius to the highest graphitizing temperature and the average heating rate is equal to or lower than 3 degrees Celsius per minute. The highest graphitizing temperature is equal to or higher than 2500 degrees Celsius.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

The graphite film according to the present disclosure is made by a high-molecular pyrolysis process, which includes carbonization and graphitization.

The carbonized film is obtained by providing a polyimide film with a depressurized or inert gas environment, and then performing a heat treatment on a polyimide film when the environment is depressurized and provided with an inert gas influx. The highest carbonizing temperature is at least 1000 degrees Celsius, preferably 1100 degrees Celsius, and more preferably 1200 degrees Celsius.

The graphite film is obtained by a graphitizing the above-described carbonized film in a depressurized or inert gas environment, in which the graphitizing temperature is at least 2400 degrees Celsius, preferably equal to or higher than 2600 degrees Celsius, and even more preferably equal to or higher than 2800 degrees Celsius. At a temperature equal to or higher than 2800 degrees Celsius, graphite films of high thermal conductivity can be obtained.

The manner the graphite film is prepared for carbonization and graphitization is not limited. For instance, the polyimide film can be cut into pieces, after which one piece of polyimide or a plurality of polyimide pieces are stacked to form a polyimide layer. Graphite Gaskets are used to separate a plurality of polyimide layers from each other, and then the polyimide layers are processed with heat treatments. Another example is to use a polyimide film roll of a length larger than five meters.

The present disclosure does not limit the heating device used in the embodiments. The heating device can be, for example, a resistance heater or an induction heater. Acheson method can be applied to the graphitization.

Figure 1:
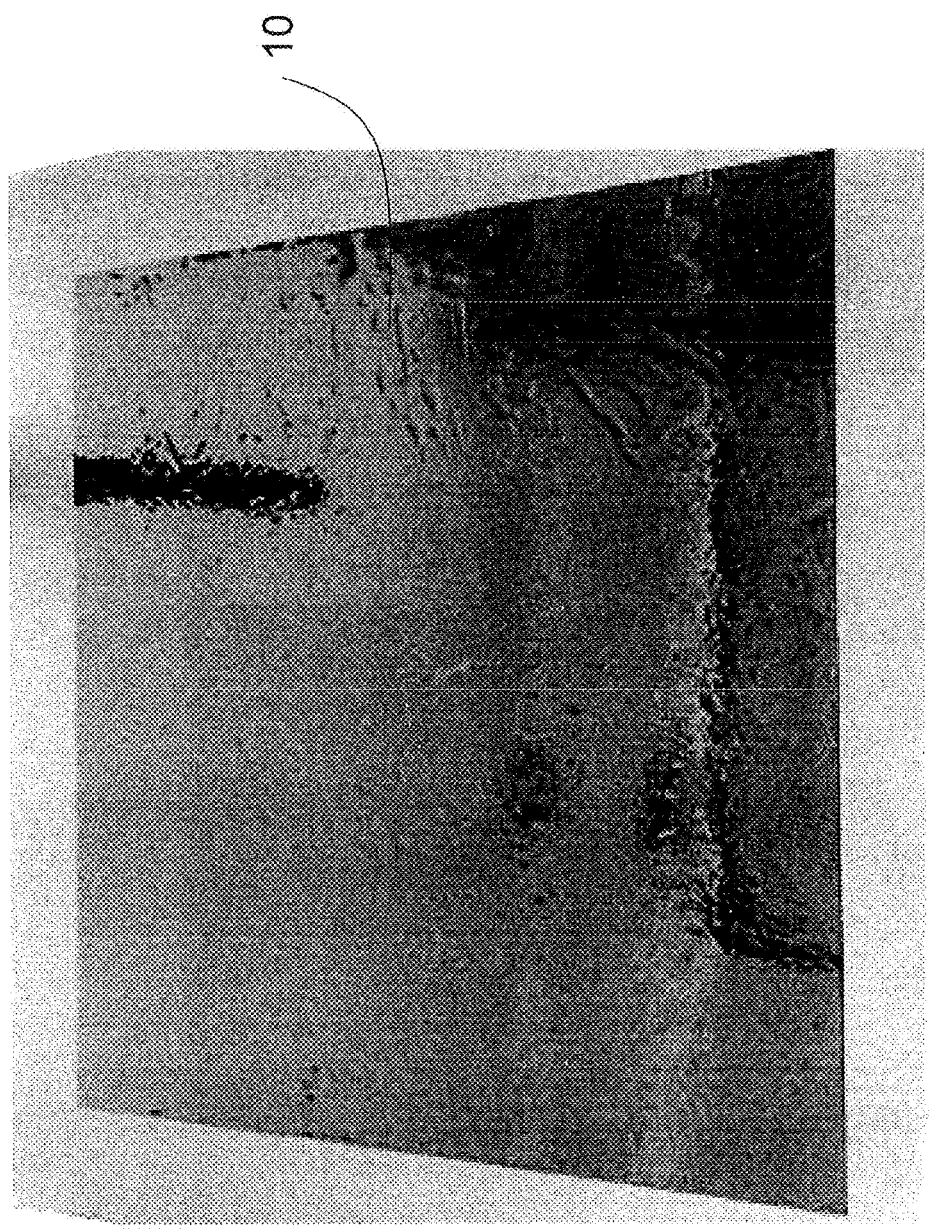
FIG. 1 is schematic view illustrating the adhesive remnants on a carbonized film in the prior art.

The adhesive remnants on the surface of carbonized films are the products of polyimide pyrolysis, i.e. tar, which are difficult to be removed completely out of the spaces between films. When the tar left on the film is carbonized, the surface of the film becomes sticky, which can easily cause damage to the film, as shown in FIG. 1. The number 10 represents the damage or defects caused by the adhesive remnants.

Figure 4:
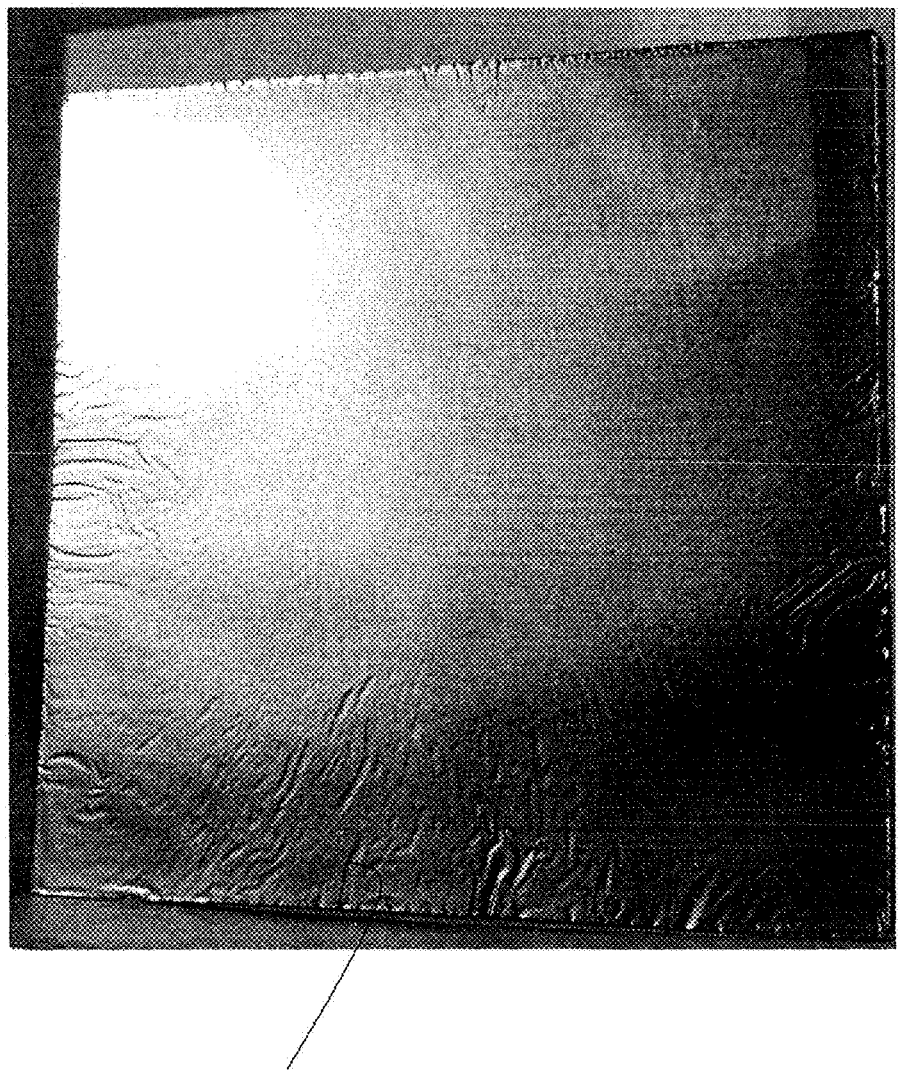
FIG. 4 is a schematic view illustrating a graphite film in the prior art with ripple patterns.

Polyimide films pyrolyze and contract during graphitization, in which ripple patterns are usually formed on the surface of the graphited films. This is due to uneven heating during the pyrolysis of polyimide films, which further causes uneven contraction. When a carbonized film is heated to 2000 degrees Celsius and above, the carbonized film is graphitized, in which the carbon structure transforms from $SP^3$ to $SP^2$ and the film expands such that the surface of the film curves. Therefore, if the film is subjected to uneven heating or rapid heating, ripple patterns will be formed on the surface of the film, as shown in FIG. 4, wherein ripple patterns 16 are formed on the surface of the graphitized film. With reference to the indicating number 16 in FIG. 4, uneven heating also results in an adhesive surface, thus causing sticking problem.

Figure 2:
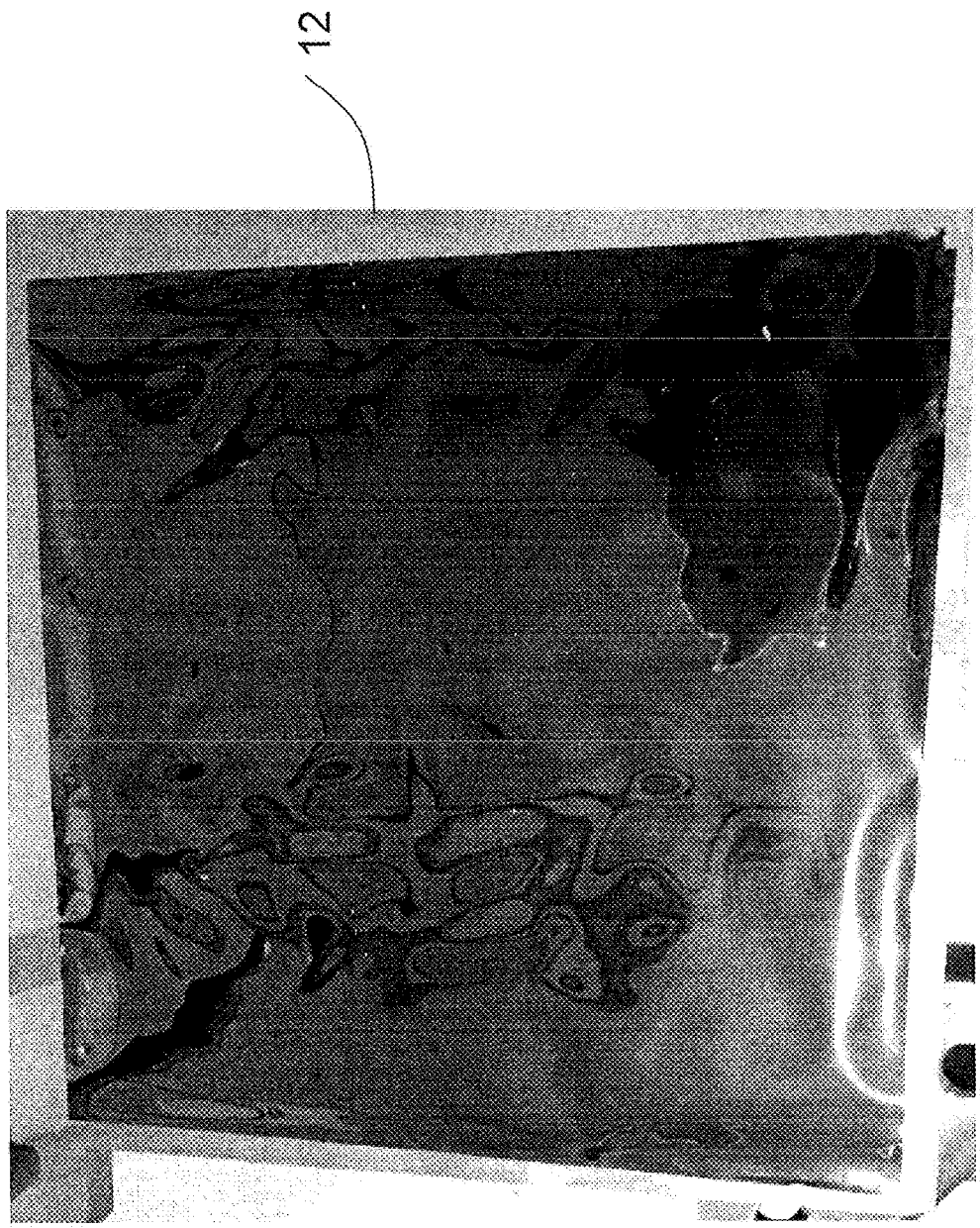
FIG. 2 is a schematic view illustrating a carbonized film without adhesive remnants.
Figure 3:
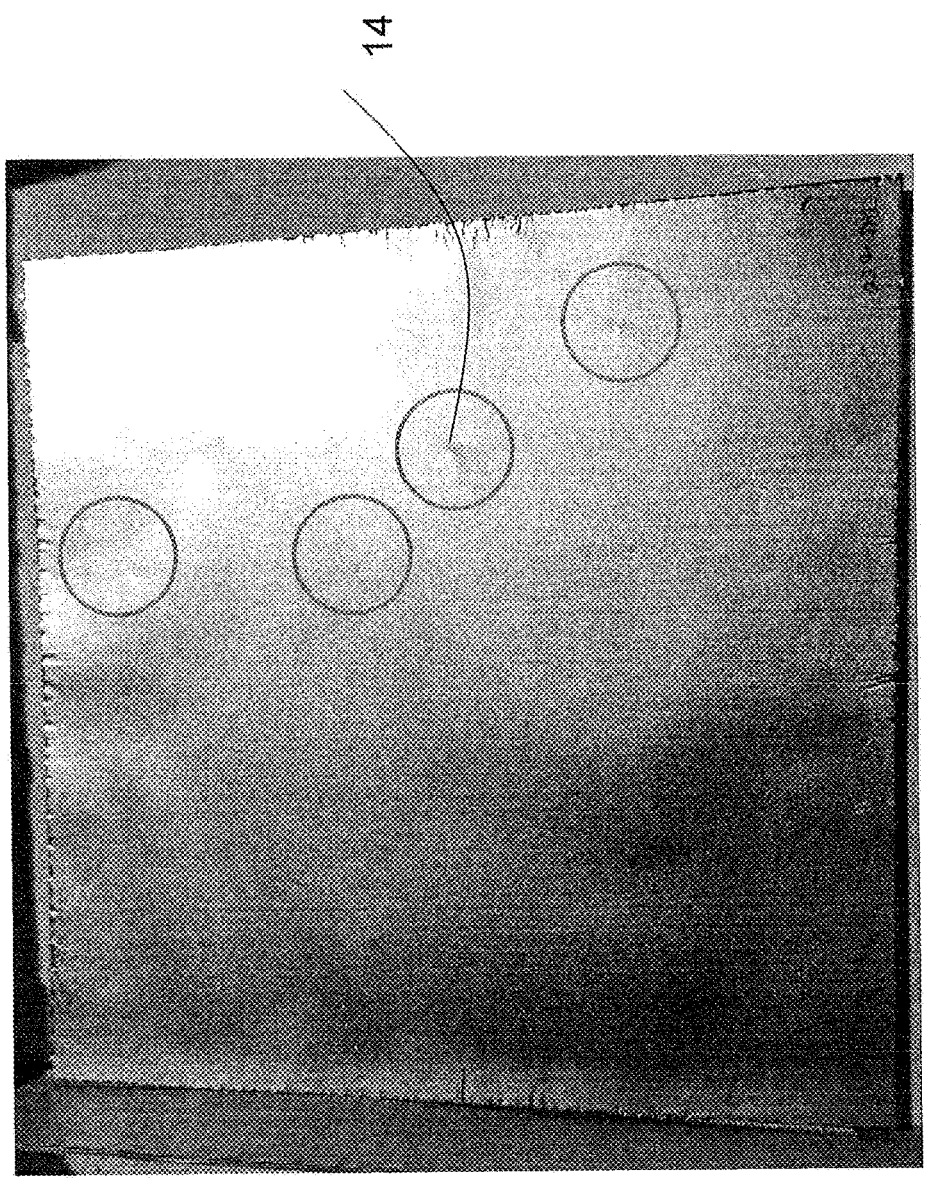
FIG. 3 is a schematic view illustrating a graphite film in the prior art with adhesive remnants.

The method of making a carbonized film provided by the present disclosure is characterized in that the polyimide precursor is heated with an average heating rate of 2 degrees Celsius per minute or lower within the temperature range 500 to 800 degrees Celsius. The highest carbonizing temperature is 1000 degrees Celsius or higher, at which a carbonized film of good quality can be obtained, as shown in FIG. 2.

The criterion for classifying the level of adhesive remnant is as follows: A: no adhesive remnant; B: one to three adhesive remnants; C: more than three adhesive remnants.

The criterion for classifying the amount of ripple patterns: A: no ripple patterns; B: area occupied by ripple patterns lower than 10%; C: area occupied by ripple patterns higher than 10%.

The First Embodiment: Preparing Graphite Films in Sheet Form

The Preparation of Carbonized Films in Sheet Form

First, provide a polyimide film manufactured by Taimide Technology Inc. (model number: TH5) as a precursor, which is sliced into 323 mm×323 mm pieces. Every five pieces of polyimide are stacked to form a layer. The polyimide layers are divided from each other by graphite divider paper of 0.25 mm. Next, the polyimide layers are heated at heating rates as follows: from room temperature to 500 degrees Celsius: 5 degrees Celsius per minute; from 500 to 800 degrees Celsius: 2 degrees Celsius per minute; from 800 degrees Celsius to the highest carbonizing temperature: 2 degrees Celsius per minute.

The Preparation of Graphite Films in Sheet Form

Provide the above carbonized film with a argon gas under atmospheric pressure, and then graphitize the carbonized film by heating, in which the heating rates are as follows: from room temperature to 2000 degrees Celsius: 10 degrees Celsius per minute; from 2000 to 2200 degrees Celsius: 5 degrees Celsius per minute; 2200 degrees Celsius or above: 3 degrees Celsius per minute. The highest graphitizing temperature is 2850 degrees Celsius, and the films should be kept at this temperature for an hour.

The Second Embodiment

Repeat the process described in the first embodiment, except that in this embodiment, the heating rate for carbonization is: from 500 to 800 degrees Celsius: 1 degree Celsius per minute, and the heating rate for graphitization is: 2200 degrees Celsius or above: 3 degrees Celsius per minute.

The Third Embodiment

Repeat the process described in the first embodiment, except that in this embodiment, the heating rate for carbonization from 500 to 800 degrees Celsius is 0.5 degrees Celsius per minute, and the heating rate for graphitization at 2200 degrees Celsius or above is 3 degrees Celsius per minute.

The Fourth Embodiment

Repeat the process described in the first embodiment, except that in this embodiment, the heating rate for carbonization from 500 to 800 degrees Celsius is 0.25 degrees Celsius per minute, and the heating rate for graphitization at 2200 degrees Celsius or above is 3 degrees Celsius per minute.

The Fifth Embodiment

Repeat the process described in the third embodiment, except that in this embodiment, the heating rate for graphitization at 2200 degrees Celsius or above is 2 degrees Celsius per minute.

The Sixth Embodiment

Repeat the process described in the third embodiment, except that in this embodiment, the heating rate for graphitization at 2200 degrees Celsius or above is 1 degree Celsius per minute.

The Seventh Embodiment

Repeat the process described in the sixth embodiment, except that in this embodiment, the heating rate for carbonization from 500 to 800 degrees Celsius is 0.25 degrees Celsius per minute.

The Eighth Embodiment

Repeat the process described in the seventh embodiment, except that in this embodiment, the highest carbonizing temperature is 1200 degrees Celsius.

The Ninth Embodiment

Repeat the process described in the seventh embodiment, except that in this embodiment, the highest carbonizing temperature is 1000 degrees Celsius.

The Tenth Embodiment

Repeat the process described in the sixth embodiment, except that in this embodiment, the highest carbonizing temperature is 1200 degrees Celsius.

The Eleventh Embodiment

Repeat the process described in the tenth embodiment, except that in this embodiment, the polyimide film has a thickness of 38 mm.

The Twelfth Embodiment

Repeat the process described in the tenth embodiment, except that in this embodiment, the polyimide film has a thickness of 62 mm, and the highest graphitizing temperature is 2750 degrees Celsius.

The Thirteenth Embodiment

Repeat the process described in the tenth embodiment, except that in this embodiment, the polyimide film has a thickness of 75 mm, and the highest graphitizing temperature is 2700 degrees Celsius.

Comparative Example 1

Repeat the process described in the first embodiment, except that in this embodiment, the heating rate for carbonization from 500 to 800 degrees Celsius is 3 degrees Celsius per minute.

Comparative Example 2

Repeat the process described in the third embodiment, except that in this embodiment, the heating rate for graphitization at 2200 degrees Celsius or above is 4 degrees Celsius per minute.

Comparative Example 3

Repeat the process described in the seventh embodiment, except that in this embodiment, the highest carbonizing temperature is 900 degrees Celsius.

The Fourteenth Embodiment: The Preparation of Graphite Films in Roll Form

The Preparation of Carbonized Films in Roll Form

First, provide a polyimide film manufactured by Taimide Technology Inc. (model number: TH5) as a precursor, which is 257 mm in width and 100 M in length. The polyimide film is wound around a tube with an inner diameter of 76.2 mm. Next, heat the precursor under a depressurized environment, in which the heating rates are as follows: from room temperature to 500 degrees Celsius: 5 degrees Celsius per minute; from 500 to 800 degrees Celsius: 0.5 degrees Celsius per minute; from 800 degrees Celsius to the highest carbonizing temperature: 2 degrees Celsius per minute.

The Preparation of Graphite Films in Roll Form

Provide the above carbonized film with a argon gas under atmospheric pressure, and then graphitize the carbonized film by heating, in which the heating rates are as follows: 2000 degrees Celsius or above: 10 degrees Celsius per minute; from 2000 to 2200 degrees Celsius: 5 degrees Celsius per minute; 2200 degrees Celsius or above: 1 degree Celsius per minute. The highest graphitizing temperature is 2850 degrees Celsius, and the films should be kept at this temperature for an hour.

The Fifteenth Embodiment

Repeat the process described in the fourteenth embodiment, except that in this embodiment, the heating rate for carbonization from 500 to 800 degrees Celsius is 1 degree Celsius per minute.

The Sixteenth Embodiment

Repeat the process described in the fourteenth embodiment, except that in this embodiment, the heating rate for carbonization from 500 to 800 degrees Celsius is 2 degree Celsius per minute.

The Seventeenth Embodiment

Repeat the process described in the fifteenth embodiment, except that in this embodiment, the heating rate for graphitization above 2200 degrees Celsius is 2 degrees Celsius per minute.

Comparative Example 4

Repeat the process described in the fourteenth embodiment, except that in this embodiment, the heating rate for graphitization from 500 to 800 degrees Celsius is 3 degrees Celsius per minute.

Comparative Example 5

Repeat the process described in the fifteenth embodiment, except that in this embodiment, the heating rate for graphitization above 2200 degrees Celsius is 3 degrees Celsius per minute.

Heat Treatment for Graphite Film in Sheet Form

| | | | Carbonization | | Graphitization | | | | |
| | | | | | 2200° C. or above: | Highest | Properties | | |
| | Film form | PI thickness μm | 500~800° C. heating rate ° C./min | Highest temperature ° C. | heating rate ° C./min | temperature ° C. | Adhesive remnants | Ripple pattern | Thermal diffusivity |
|---|---|---|---|---|---|---|---|---|---|
| Embodiment 1 | sheet | 50 | 2 | 1300 | 3 | 2850 | B | B | 7.8 |
| Embodiment 2 | sheet | 50 | 1 | 1300 | 3 | 2850 | B | B | 7.9 |
| Embodiment 3 | sheet | 50 | 0.5 | 1300 | 3 | 2850 | A | B | 7.9 |
| Embodiment 4 | sheet | 50 | 0.25 | 1300 | 3 | 2850 | A | B | 7.9 |
| Embodiment 5 | sheet | 50 | 0.5 | 1300 | 2 | 2850 | B | B | 8.0 |
| Embodiment 6 | sheet | 50 | 0.5 | 1300 | 1 | 2850 | A | A | 8.0 |
| Embodiment 7 | sheet | 50 | 0.25 | 1300 | 1 | 2850 | A | A | 8.0 |
| Embodiment 8 | sheet | 50 | 0.25 | 1200 | 1 | 2850 | A | A | 8.0 |
| Embodiment 9 | sheet | 50 | 0.25 | 1000 | 1 | 2850 | A | A | 7.9 |
| Embodiment 10 | sheet | 50 | 0.5 | 1200 | 1 | 2850 | A | A | 8.0 |
| Embodiment 11 | sheet | 38 | 0.5 | 1200 | 1 | 2850 | A | A | 8.3 |

-continued

|  | Film form | PI thickness μm | Carbonization 500~800° C. | | Graphitization 2200° C. or above: | | Properties | | |
|---|---|---|---|---|---|---|---|---|---|
|  |  |  | heating rate ° C./min | Highest temperature ° C. | heating rate ° C./min | Highest temperature ° C. | Adhesive remnants | Ripple pattern | Thermal diffusivity |
| Embodiment 12 | sheet | 62 | 0.5 | 1200 | 1 | 2750 | A | A | 7.8 |
| Embodiment 13 | sheet | 75 | 0.5 | 1200 | 1 | 2700 | A | A | 7.6 |
| Comparative Example 1 | sheet | 50 | 3 | 1300 | 3 | 2850 | C | B | 7.8 |
| Comparative Example 2 | sheet | 50 | 0.5 | 1300 | 4 | 2850 | B | C | 7.6 |
| Comparative Example 3 | sheet | 50 | 0.25 | 900 | 1 | 2850 | C | B | 7.6 |

The criterion for classifying the level of adhesive remnant is as follows: A: no adhesive remnant; B: one to three adhesive remnants; C: more than three adhesive remnants.

The criterion for classifying the amount of ripple patterns: A: no ripple patterns; B: area occupied by ripple patterns lower than 10%; C: area occupied by ripple patterns higher than 10%.

quality can be obtained, which becomes graphite film of high thermal diffusivity after graphitization.

Figure 5:
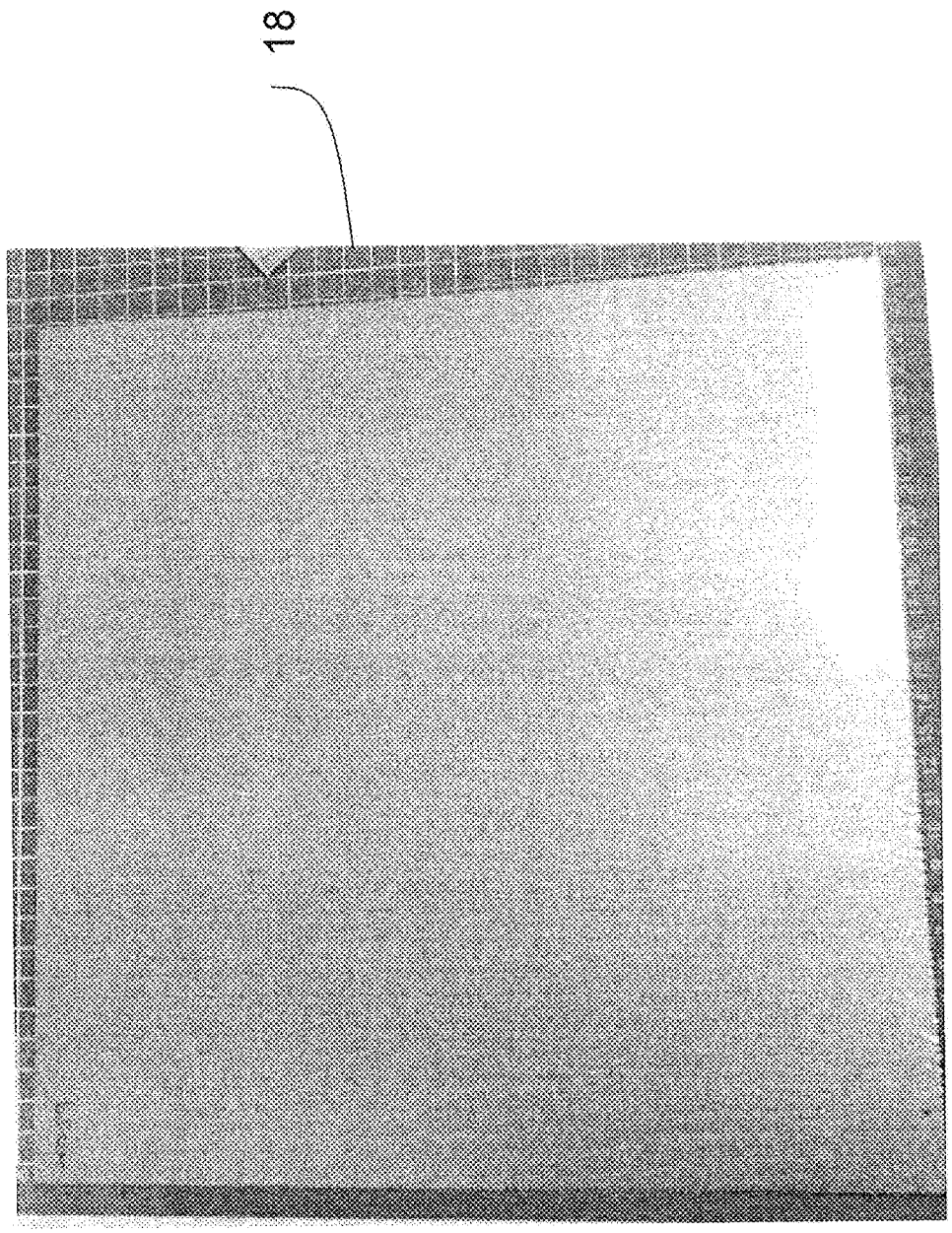
FIG. 5 is a schematic view illustrating a graphite film without adhesive remnants and ripple patterns.

In the tenth to the thirteenth embodiments, polyimide films of different thicknesses are graphitized and graphite films of minimal defect in appearance and high thermal diffusivity can be obtained, as shown in FIG. 5.

Heat Treatment for Graphite Film in Roll Form

|  | Film form | PI thickness μm | Carbonization temperature range 500~800° C. | | Graphitization temperature range 2200° C. or above | | Properties | | |
|---|---|---|---|---|---|---|---|---|---|
|  |  |  | heating rate ° C./min | Highest temperature ° C. | heating rate ° C./min | Highest temperature ° C. | Adhesive remnants | Ripple pattern | Thermal diffusivity |
| Embodiment 14 | Roll | 50 | 0.5 | 1200 | 1 | 2850 | A | A | 7.9 |
| Embodiment 15 | Roll | 50 | 1 | 1200 | 1 | 2850 | A | A | 7.9 |
| Embodiment 16 | Roll | 50 | 2 | 1200 | 1 | 2850 | B | A | 7.9 |
| Embodiment 17 | Roll | 50 | 1 | 1200 | 2 | 2850 | A | A | 7.8 |
| Comparative Example 4 | Roll | 50 | 3 | 1200 | 1 | 2850 | C | A | 7.9 |
| Comparative Example 5 | Roll | 50 | 1 | 1200 | 3 | 2850 | B | B | 7.7 |

Compare the first to the fourth embodiments with comparative example 1 and it can be seen that, when the heating rate for carbonization 500 to 800 degrees Celsius is reduced from 3 degrees Celsius per minute to 0.5 degrees Celsius per minute, the level of adhesive remnants will be reduced from C to A. This is because there is sufficient time for the polyimide films to pyrolyze and for the tar to be removed from the polyimide films.

Compare the fifth to the sixth embodiments with comparative example 2 and it can be seen that, when the heating rate for graphitization within 2200 degrees Celsius to the highest graphitizing temperature is reduced from 4 degrees Celsius per minute to 1 degree Celsius per minute, the amount of ripple patterns is reduced from C to A. This is because there is sufficient thermal energy for graphitization.

Compare the seventh to the ninth embodiments with comparative example 3 and it can be seen that, when the highest carbonizing temperature is increased, the pyrolysis products can be fully pyrolyzed, and carbonized film of high Compare the fourteenth and the sixteenth embodiments with comparative example 4 and it can be seen that, when the heating rate for graphitization within 500 to 800 degrees Celsius is reduced from 3 degrees Celsius per minute to 0.5 degrees Celsius per minute, the amount of adhesive remnants can be reduced from C to A. This is because there is sufficient time for the polyimide films in roll form to pyrolyze and for the tar to be removed from the polyimide films.

Compare the fifteenth and the seventeenth embodiments with comparative example 5 and it can be seen that, if the heating rate for graphitization within 2200 degrees Celsius to the highest graphitizing temperature is reduced from 3 degrees Celsius per minute to 1 degree Celsius per minute, the amount of ripple patterns can be reduced to A at 2 degrees Celsius per minute. At 1 degree Celsius per minute, the carbonized film has better thermal diffusivity due to sufficient heating time.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A method of making a graphite film, comprising:
   providing a polyimide film as a precursor;
   performing a carbonizing heat treatment on the polyimide film so as to form a carbonized film;
   heating the carbonized film from room temperature to 2000 degrees Celsius at a first heating rate, and heating the carbonized film from 2000 degrees Celsius to 2200 degrees Celsius at a second heating rate lower than the first heating rate; and
   performing a graphitizing heat treatment on the carbonized film, in which the graphitizing temperature during the graphitizing heat treatment is increased from 2200 degrees Celsius to a highest graphitizing temperature and the average heating rate is equal to or lower than 3 degrees Celsius per minute.

2. The method according to claim 1, wherein the heating rate during the carbonizing heat treatment within 500 to 800 degrees Celsius is equal to or lower than 2 degrees Celsius per minute.

3. The method according to claim 2, wherein the heating rate during the carbonizing heat treatment within 500 to 800 degrees Celsius is equal to or lower than 1 degrees Celsius per minute.

4. The method according to claim 1, wherein the polyimide film is in sheet form or in roll form.

5. The method according to claim 1, wherein the highest carbonizing temperature during the carbonizing heat treatment is 1300 degrees Celsius.

6. The method according to claim 1, wherein the average heating rate during the graphitizing heat treatment is equal to or lower than 1 degrees Celsius per minute.

7. The method according to claim 1, wherein the highest graphitizing temperature during the graphitizing heat temperature is 2800 degrees Celsius.

8. A method of making a graphite film, comprising:
   providing a polyimide film as a precursor;
   performing a carbonizing heat treatment within 500 to 800 degrees Celsius on the polyimide film so as to form a carbonized film, wherein the heating rate during the carbonizing heat treatment is equal to or lower than 2 degrees Celsius per minute; and
   performing a graphitizing heat treatment on the carbonized film, in which the graphitizing temperature during the graphitizing heat treatment is increased from 2200 degrees Celsius to a highest graphitizing temperature and the average heating rate is equal to or lower than 3 degrees Celsius per minute.

9. The method according to claim 8, wherein the heating rate during the carbonizing heat treatment within 500 to 800 degrees Celsius is equal to or lower than 1 degrees Celsius per minute.

10. The method according to claim 8, wherein the polyimide film is in sheet form or in roll form.

11. The method according to claim 8, wherein the average heating rate during the graphitizing heat treatment is equal to or lower than 1 degrees Celsius per minute.

12. The method according to claim 8, wherein the highest graphitizing temperature during the graphitizing heat temperature is 2800 degrees Celsius.

* * * * *